(12) United States Patent
Faber et al.

(10) Patent No.: US 7,575,794 B2
(45) Date of Patent: Aug. 18, 2009

(54) HIGH STRENGTH SUBSTANTIALLY NON-MICROCRACKED CORDIERITE HONEYCOMB BODY AND MANUFACTURING METHOD

(75) Inventors: Margaret Kathleen Faber, Corning, NY (US); Weiguo Miao, Horseheads, NY (US); Tinghong Tao, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 243 days.

(21) Appl. No.: 11/897,141

(22) Filed: Aug. 29, 2007

(65) Prior Publication Data

US 2008/0057269 A1 Mar. 6, 2008

Related U.S. Application Data

(60) Provisional application No. 60/840,799, filed on Aug. 29, 2006.

(51) Int. Cl.
*B32B 3/12* (2006.01)
*B01D 39/06* (2006.01)
*C03C 10/08* (2006.01)

(52) U.S. Cl. .............................. 428/116; 55/523; 501/9

(58) Field of Classification Search ................. 428/116, 428/117, 118, 119, 13, 188, 913, 327, 73, 428/307.3, 34.4, 177, 304.4, 192; 501/118, 501/119, 120, 153, 154; 165/10; 502/527, 502/180, 178, 527.16, 527.15, 527.17; 264/177.12, 264/347; 55/523, 483, 502, 529, 482; 156/60, 156/89.11
See application file for complete search history.

(56) References Cited

U.S. PATENT DOCUMENTS

| | | | | |
|---|---|---|---|---|
| 5,549,725 | A | 8/1996 | Kasai et al. | 55/523 |
| 5,552,349 | A | 9/1996 | Ichii et al. | 501/9 |
| 6,736,875 | B2 * | 5/2004 | Gadkaree et al. | 55/523 |
| 2004/0029707 | A1 * | 2/2004 | Beall et al. | 501/119 |

FOREIGN PATENT DOCUMENTS

| | | |
|---|---|---|
| EP | 1 586 547 | 10/2005 |
| WO | 00/40521 | 7/2000 |

* cited by examiner

*Primary Examiner*—Timothy M Speer
*Assistant Examiner*—Gordon R Baldwin
(74) *Attorney, Agent, or Firm*—Matthew B. McNutt

(57) ABSTRACT

Porous, non-microcracked cordierite ceramic bodies having high strength, high strain tolerance, and high thermal shock resistance are produced from cordierite powder batch mixtures of controlled powder particle size fired according to a schedule that prevents objectionable cordierite grain growth, maintaining a small cordierite crystalline domain size in order to minimize or prevent microcracking in the product.

7 Claims, No Drawings

HIGH STRENGTH SUBSTANTIALLY NON-MICROCRACKED CORDIERITE HONEYCOMB BODY AND MANUFACTURING METHOD

RELATED INVENTIONS

This application claims priority to, and the benefit of, U.S. Provisional Patent Application No. 60/840,799 filed Aug. 29, 2006 entitled "High Strength Cordierite Body," the disclosure of which is hereby incorporated by reference herein.

FIELD OF THE INVENTION

The present invention pertains to ceramic bodies, and more particularly to porous cordierite honeycomb bodies, and methods for manufacturing same.

BACKGROUND OF THE INVENTION

The development of low thermal expansion cordierite ceramic honeycombs for applications such as filters and catalyst supports for treating the exhaust gases emitted by trucks and automobiles has now proceeded continuously for close to thirty years. The most widely used honeycombs of this type can be characterized as highly microcracked and highly oriented bodies, in that the cordierite crystals present in the honeycombs microcrack on cooling after firing and are preferentially aligned as the result of the honeycomb extrusion forming process. Both of these features combine to significantly reduce the thermal expansion coefficient and improve the resistance to thermal shock damage of the formed honeycombs.

However, as engine emission requirements are tightened, further improvements in the mechanical and thermal properties of filters and catalyst supports will be needed. For example, the mechanical strengths of current honeycomb products are somewhat limited, due to the highly microcracked nature of the cordierite phases making up the materials. Strength improvements will be required as new honeycomb substrates and filters designed with thinner honeycomb walls and/or substantially higher wall porosities are developed.

The presence of microcracks can also be problematic in other ways. For example, commercial washcoating materials of high-surface-area alumina used to support emissions control catalysts on these honeycombs can readily penetrate the microcracks present in the cordierite, in some cases resulting in unacceptable increases in the coefficient of thermal expansion (CTE) and elastic modulus of the coated products. Further, soot and ash particulates present in combustion engine exhaust streams can also penetrate the microcracked structure and can similarly impact thermal expansion and elastic properties. The most objectionable result of these properties changes is that the thermal shock resistance of the honeycombs, i.e. their resistance to breakage when exposed to rapid temperature changes, can be degraded.

SUMMARY OF THE INVENTION

The present invention provides a process for manufacturing cordierite honeycomb products wherein the predominant cordierite crystal phase is substantially free of microcracks. The resulting product exhibits improved strength and correspondingly improved thermal shock resistance, as well as excellent resistance to changes in thermal and mechanical properties that might otherwise be caused by washcoating materials or the soot and/or ash deposits that normally accumulate on or within the walls of such honeycombs.

In a first aspect, therefore, the invention provides a method of making a high strength porous cordierite body with high strain tolerance, the body being substantially devoid of microcracking and preferred cordierite crystal orientation. The essential steps of that method include, first, mixing fine-particle-size cordierite powder with a liquid vehicle and at least one organic additive selected from the group consisting of binders, lubricants, surfactants and pore-formers to form a plastic batch mixture. The fine-particle-size cordierite powder will preferably consist of a fine powder produced by the pre-reaction of cordierite precursor sources of magnesia, alumina and silica. The binders, lubricants, surfactants and the like are typically present to improve the plasticity or other processing characteristics of the batch.

The plastic batch mixture thus provided is next formed into a honeycomb shape and dried to remove part or all of the liquid vehicle. Forming is typically accomplished by passing the plastic batch mixture through an extrusion die. Drying can be accelerated using conventional radiation heating methods.

The formed and dried honeycomb this provided is finally fired at a temperature and for a time sufficient to sinter the cordierite powder into a strong unitary cordierite body but insufficient to develop cordierite crystal domains exhibiting a preferred orientation or a microcracked crystalline habit. The firing step is a particularly important aspect of this process, since it must be at a temperature sufficiently high to develop the required honeycomb strength, yet sufficiently short in duration to avoid physical or chemical interactions that would generate a fired structure exhibiting microcracking after firing. Properly fired, the product of this process will be a ceramic article consisting essentially of fine-grained cordierite that is characterized by an absence of both microcracks and preferred orientations of the cordierite crystal grains.

The above-described microstructure yields a cordierite ceramic honeycomb exhibiting high thermal shock resistance, a low elastic modulus, and a porosity and pore size distribution that can be adjusted for a wide range of exhaust gas filtration and catalyst support applications. The high thermal shock resistance of these honeycombs is attributed in part to the low room-temperature elastic modulus thereof which imparts a high strain tolerance to the fired material, i.e., a high ratio of modulus of rupture (MOR) strength to room temperature elastic modulus.

Products provided in accordance with the method of the invention include a porous, high strength, ultra-thinwall cordierite ceramic catalyst support, a strong, high porosity, ceramic catalyst support suitable for supporting catalysts for the SCR (selective catalytic reduction) processing of nitrogen oxide-containing exhaust streams, and a high strength, high porosity wall flow filter structure for the removal of particulates from diesel engine exhausts. All of these products exhibit an absence of microcracks with no preferred orientation of the cordierite crystal grains and provide high strength, a high strain tolerance, and a corresponding high resistance to thermal shock damage.

DETAILED DESCRIPTION

As noted above, the advantageous thermal shock resistant properties of non-microcracked cordierite ceramics derive in large part from the combination of high strength and a reasonably low elastic modulus at high temperatures exhibited by those materials. Table 1 below sets forth properties for two different ceramic honeycomb products of roughly equivalent geometry and porosity. The ceramics are of suitable geometry and sufficiently high porosity to be useful for the wall flow filtration of particulates from diesel engine exhaust gas. The geometric parameters of the honeycombs are reported in the format [cell density (cd)/cell wall thickness (wt)] in units, respectively, of cells/in$^2$ of honeycomb cross-section and thousandths of an inch of cell wall thickness.

TABLE I

Cordierite Honeycomb Properties

| | Sample No. | |
|---|---|---|
| | 1 | 2 |
| Honeycomb geometry [cd/wt] | 200/19 | 100/17 |
| Ceramic type | Microcracked | Non-microcracked |
| Porosity (%) | 44 | 44 |
| Normalized MOR (psi) | 1397 | 3751 |
| E-Mod (106 psi) @ 500° C. | 1.20 | 0.91 |
| Average CTE (10$^{-7}$/° C., 25-800° C.) | 6 | 19 |
| Thermal Shock Resistance (° C.) | 1150 | 1050 |

As the data in Table 1 reflect, the non-microcracked honeycomb has a modulus of rupture (MOR) strength (normalized to account for geometry differences) that is more than twice that of the microcracked honeycomb. Further, the non-microcracked material has a high-temperature elastic modulus (E-mod) that is significantly below the elastic modulus of the microcracked honeycomb, both as measured at 500° C.

The thermal shock resistance (TSR) of a ceramic body is related to the stress at fracture (corresponding to the modulus of rupture (MOR) strength), the elastic modulus (E), and the strain at fracture, the latter being the product of the thermal expansion coefficient ($\alpha$) of the material and thermal gradient ($\Delta T$) within the body, through the following expression:

$$TSR \propto \frac{MOR}{E \cdot \alpha \cdot \Delta T}$$

Thermal shock resistance for a ceramic honeycomb structure is generally reported as the threshold temperature at and below which rapid cooling of the body to room temperature does not cause cracking or other honeycomb damage.

High levels of thermal shock resistance have typically been sought by attempting to obtain extremely low values of the thermal expansion coefficient $\alpha$, or through methods to reduce thermal gradients during high temperature use. However, it can be seen from the expression above that use of a material with a sufficiently high strength and a sufficiently low bulk elastic modulus (these imparting an increased strain tolerance [MOR/E]) could offer adequate thermal shock resistance for some applications. Thus, in the case of the Table 1 examples, even though the average coefficient of thermal expansion (25-800° C.×10$^{-7}$/° C.) of the non-microcracked honeycomb is more than twice that of the microcracked honeycomb, the high MOR and low elastic modulus E impart thermal shock resistance to a temperature of 1050° C. (TSR=1050° C.) for the non-microcracked honeycomb, a value that is quite close to the 1150° C. thermal shock resistance of the microcracked honeycomb. Accordingly, TSR≧1000° C., or even TSR≧1000° C. may be provided by the non-microcracked cordierite honeycombs of the invention.

The cordierite powders utilized in the method of the invention may suitably comprise synthesized powders resulting from the reaction-sintering of clay-talc-alumina batch mixtures to fully develop a principal cordierite crystalline phase therein. Typical powder mean particle sizes (diameters) are in the range of 5-60 μm, more preferably in the range of 10-50 μm. The cordierite powder component of the dry batch will generally be at least 70% by weight, and will preferably be high enough so that the fired cordierite bodies comprise at least 90% by weight of cordierite.

As noted, it is important to use relatively short firing temperature to consolidate dried honeycomb shapes to strong unitary cordierite bodies in order to insure that the cordierite crystal domains remain small enough to avoid microcracking on cooling. Firing to peak temperatures not exceeding about 1420° C., with exposures of the honeycombs to firing temperatures above 1405° C. being limited to not more than about eight hours, are preferred for that purpose. Firing temperatures of this duration can produce cordierite honeycomb products wherein cordierite crystallite grain sizes do not exceed about 30 μm in diameter.

An illustrative procedure to prepare a cordierite ceramic honeycomb in accordance with the invention is as follows. A fine cordierite powder is first prepared by crushing and grinding a synthesized cordierite (2MgO.2Al$_2$O$_3$.5SiO$_2$) ceramic, the grinding of the crushed cordierite material being continued until an average powder particle size of about 10 micrometers is achieved. The fine cordierite powder thus provided is blended with a methyl cellulose binder, a metal stearate lubricant and, optionally, a starch pore former to produce powdered batch mixtures. Representative batch mixtures of this type are reported in Table 2 below, wherein the proportions of each of the batch ingredients are reported in parts by weight of the final dry mixtures.

TABLE 2

Non-microcracked Cordierite Batch Mixtures

| \Batch ID Batch constituent\ | A | B |
|---|---|---|
| cordierite powder (10 μm) | 100 | 100 |
| Starch | — | 25 |
| methyl cellulose binder | 7 | 7 |
| metal stearate lubricant | 1 | 1 |

A water vehicle is next added to each of these batch mixtures in a proportion sufficient to produce a paste consistency, and the powder/water mixtures are plasticized by further mixing. Each of the plasticized mixtures is thereafter processed through an extruder to produce honeycomb shapes, the extruded honeycombs then being dried to remove most of the water therefrom.

The dried honeycomb shapes thus provided are next fired to remove organic constituents and to sinter the cordierite powders into strong unitary honeycomb ceramic articles. In order to prevent extensive sintering and/or the promotion of chemical interactions among powder grains that could promote microcracking of the products, the firing treatments are carried out at a peak firing temperature of about 1405° C. with the time of exposure to the peak firing temperature being about 6 hours. Following sintering, the honeycombs are cooled to room temperatures and examined.

Table 3 below sets forth porosity and pore size data for ceramic honeycomb structures made from the A and B batches set out in Table 2. Included for each honeycomb type in Table 3 are the porosities of the honeycombs, in percent by volume of open pores, and the mean pore diameter $d_{50}$, which denotes the pore diameter, in microns (micrometers—i.e., $10^{-6}$ meters), at which 50% of the total pore volume of the material resides in pores of a smaller diameter as determined by conventional mercury porosimetry.

TABLE 3

Non-microcracked Cordierite Porosity

| Porosity Characteristics Batch ID | Porosity (%) | Mean Pore Size (μm) |
|---|---|---|
| Batch A Honeycomb | 20.1 | 1.8 |
| Batch B Honeycomb | 48.6 | 9.0 |

Honeycomb products produced as above described will generally have relatively high coefficients of thermal expansion, due to substantial freedom from microcracking. However, they will also exhibit high strengths and relatively low high temperature elastic moduli when compared to microcracked ceramic honeycombs prepared from MgO, $Al_2O_3$ and $SiO_2$ precursors by reaction sintering through prolonged firing treatments. Accordingly their resistance to thermal shock damage will be significantly greater than expected from their high thermal expansion coefficients.

Honeycomb products made in accordance with the method of the invention will in some cases offer significant performance advantages over conventionally made honeycombs of otherwise similar design. Included in this category are honeycomb products intended to be coated with washcoating or catalyst formulations prior to use, such as the so-called ultra-thinwall cordierite honeycombs used as catalysts supports in gasoline engine exhaust treatment systems. Cordierite honeycombs of this type made according to the invention will have honeycomb channel walls of 25-100 μm thickness, mean pore sizes not exceeding about 5 μm, and average coefficients of thermal expansion in the range of $16\text{-}20\times10^{-7}/°$ C. over the temperature range 25-800° C. Additionally, the products will have a strain tolerance (MOR/E) greater than $10^{-3}$, E being the elastic modulus of the honeycomb material at 500° C. and MOR being the modulus of rupture strength of the material at room temperature, as determined in conventional four-point bending.

Also benefiting from the absence of microcracks are high porosity honeycombs for applications such as catalyzed diesel exhaust filters or substrates, including substrates for SCR catalysts used for the control of nitrogen oxide exhaust emissions. Characteristic features of such products when made according to the invention include, in addition to an average coefficient of thermal expansion in the range of $16\text{-}20\times10^{-7}/°$ C. over the temperature range 25-800° C., a strain tolerance (MOR/E) greater than $10^{-3}$, a mean pore diameter greater than 10 μm and up to 20 μm, and a total porosity of 45-65%.

For diesel particulate filters within these ranges the preferred pore size distributions will be narrow. The narrow pore size distributions will be such that the ceramic will have a d-factor of less than 0.60, wherein the d-factor is defined as the ratio: $(d_{50}-d_{10})/d_{50}$, wherein $d_{50}$ and $d_{10}$ are the pore diameters at which 50% and 10%, respectively, of the total pore volume of the porous cordierite ceramic resides in pores of a smaller diameter. For particularly high porosity products, i.e., products with porosities in the range of 55-65%, the mean pore diameter should be larger than 15 μm.

Of course the detailed descriptions above have been presented for the purpose of illustration only, it being apparent therefrom that various modifications and changes to the particular embodiments described may be made to adapt the invention to particular applications within the scope of the appended claims.

What is claimed is:

1. A cordierite honeycomb body having:
   honeycomb channel walls of 25 μm-100 μm thickness,
   a mean ceramic pore size not exceeding 5 μm;
   an average coefficient of thermal expansion in the range of $16\text{-}20\times10^{-7}/°$ C. over the temperature range 25-800° C.;
   a strain tolerance (MOR/E) greater than $10^{-3}$; wherein said cordierite honeycomb is made by a method comprising the steps of:
   a) mixing fine-particle-size cordierite powder with a liquid vehicle and at least one organic additive selected from the group consisting of binders, lubricants, surfactants and pore-formers to form a plastic batch mixture;
   b) forming the plastic batch mixture into a honeycomb shape and drying the honeycomb shape; and
   c) firing the honeycomb shape at a temperature and for a time sufficient to sinter the cordierite powder into a strong unitary cordierite body but insufficient to develop cordierite crystal domains exhibiting a preferred orientation and the body being substantially devoid of microcracking and having a cordierite crystallite mean grain size that does not exceed 30 μm.

2. A cordierite honeycomb body having:
   an average coefficient of thermal expansion in the range of $16\text{-}20\times10^{-7}/°$ C. over the temperature range 25-800° C.;
   a strain tolerance (MOR/E) greater than $10^{-3}$;
   a mean pore diameter $d_{50}$ in the range 10 μm$<d_{50}\leqq$20 μm;
   a total porosity of 45-65%; wherein said cordierite honeycomb is made by a method comprising the steps of:
   a) mixing fine-particle-size cordierite powder with a liquid vehicle and at least one organic additive selected from the group consisting of binders, lubricants, surfactants and pore-formers to form a plastic batch mixture;
   b) forming the plastic batch mixture into a honeycomb shape and drying the honeycomb shape; and
   c) firing the honeycomb shape at a temperature and for a time sufficient to sinter the cordierite powder into a strong unitary cordierite body but insufficient to develop cordierite crystal domains exhibiting a preferred orientation and the body being substantially devoid of microcracking and having a cordierite crystallite mean grain size that does not exceed 30 μm.

3. A cordierite honeycomb body according to claim 2 wherein the pore size distribution of the cordierite ceramic is characterized by a d-factor of less than 0.60 wherein the d-factor=$(d_{50}-d_{10})/d_{50}$.

4. A cordierite honeycomb body in accordance with claim 2 having a porosity in the range of 55-65%.

5. A cordierite honeycomb body in accordance with claim 2 having a porosity in the range of 55-65% and a mean pore diameter greater than 15 μm.

6. A cordierite honeycomb body in accordance with claim 2 having an average coefficient of thermal expansion in the range of $16\text{-}20\times10^{-7}/°$ C. over the temperature range 25-800° C.

7. A cordierite honeycomb body in accordance with claim 2 having TSR$\geqq$1000° C.

* * * * *